(12) United States Patent
Lammers et al.

(10) Patent No.: US 7,779,196 B2
(45) Date of Patent: Aug. 17, 2010

(54) INTERFACE BETWEEN BUSSES OF DIFFERENT PHYSICAL LAYERS

(75) Inventors: Ronald M. Lammers, Hilversum (NL); Gert G. Kok, Vinkeveen (NL)

(73) Assignee: Snap-On Technologies, Inc., Lincolnshire, IL (US)

( * ) Notice: Subject to any disclaimer, the term of this patent is extended or adjusted under 35 U.S.C. 154(b) by 275 days.

(21) Appl. No.: 11/363,952

(22) Filed: Mar. 1, 2006

(65) Prior Publication Data

US 2007/0245042 A1    Oct. 18, 2007

(51) Int. Cl.
G06F 13/36     (2006.01)
G06F 3/00      (2006.01)
G06F 13/00     (2006.01)

(52) U.S. Cl. .................... 710/315; 710/16; 710/31; 710/306

(58) Field of Classification Search ............ 710/16, 710/31, 306, 315
See application file for complete search history.

(56) References Cited

U.S. PATENT DOCUMENTS

| | | | | |
|---|---|---|---|---|
| 4,394,605 | A | * | 7/1983 | Terazawa .................. 315/280 |
| 6,111,888 | A | * | 8/2000 | Green et al. ............... 370/461 |
| 6,535,028 | B1 | * | 3/2003 | Baker ....................... 327/63 |
| 6,822,970 | B1 | * | 11/2004 | Redd et al. ................ 370/446 |
| 2006/0130049 | A1 | * | 6/2006 | Eimers-Klose et al. ...... 717/171 |

FOREIGN PATENT DOCUMENTS

| | | |
|---|---|---|
| DE | 102 54 285 A1 | 6/2004 |
| EP | 1 401 158 A1 | 3/2004 |
| SU | 1293861 A1 * | 2/1987 |
| WO | WO 00/07335 | 2/2000 |

OTHER PUBLICATIONS

"Overvoltage Fault Protected CAN Transceiver", Linear Technology LT1796, pp. 1-8.
"CAN controller interface" Philips Semiconductors PCA82C250, pp. 1-20.
"Single wire CAN transceiver" Philips Semiconductors AU5790, pp. 1-20.
International Search Report and Written Opinion issued in corresponding International Patent Application No. PCT/US2007/003013, mailed Sep. 14, 2007.
European Office Action issued in European Patent Application No. EP 07 749 921.8-1244 dated Nov. 13, 2009.

* cited by examiner

*Primary Examiner*—Alford W Kindred
*Assistant Examiner*—Farley J Abad
(74) *Attorney, Agent, or Firm*—McDermott Will & Emery LLP

(57) ABSTRACT

First and second networks, for example Controller Area Networks (CANs), of different physical layers are interfaced by applying signals of the busses of the two networks to respective transceivers. A dominant state of one of the busses is sensed and data is transferred between the two transceivers in a direction from the dominant bus. The two busses are interfaced by a logic circuit interposed between the transceivers. A control circuit is coupled to the first and second logic units for mutually exclusively activating and deactivating the first and second logic units to control the direction of data transfer between the busses.

9 Claims, 2 Drawing Sheets

INTERFACE BETWEEN BUSSES OF DIFFERENT PHYSICAL LAYERS

TECHNICAL FIELD

The present disclosure relates to the control of data transfer between bus systems having different physical layer characteristics, more particularly to controlling the direction of data transfer between single wire and dual wire busses.

BACKGROUND

A Controller Area Network (CAN) is a serial network using a protocol that defines the data link and part of the physical layer in the OSI model. A CAN bus is a broadcast bus that can link to a plurality of transceiver nodes. The bits in a CAN message can be sent as either high or low. Data messages conventionally are in Non-Return To Zero (NRZ) bit coding with bit stuffing used to complete message frames.

A dominant bus state, conventionally logical 0, and a recessive bus state, conventionally logical 1, correspond to electrical levels that depend on the physical layer used. If a communication node connected to the bus is driving the bus to the dominant state, the whole bus is in that state regardless of the number of nodes transmitting a recessive state. Before sending a message bit, a CAN node checks if the bus is busy to avoid collision. As low bits are always dominant, if one node tries to send a low and another node tries to send a high, the result on the bus will be a low. This functionality corresponds to a logical AND since the recessive state (logically high level) is obtained only when all nodes output a logically high level. A transmitting node always checks on the bus while transmitting. A node that sends a high in the arbitration field and detects a low knows that it has lost arbitration. It stops transmitting, letting the other node, with a higher priority message, continue uninterrupted.

Data messages transmitted from any node on the CAN bus do not contain addresses of either the transmitting node or intended receiving node(s). A message, instead, is labeled with an identifier. Each of the other nodes on the network receive the message and check the identifier to determine if the message is relevant to the particular receiving node. Two nodes on the network are not allowed to send messages with the same identifier. If two nodes attempt to send a message with the same identifier at the same time, one of the transmitting nodes will detect that its message is distorted outside of the arbitration field.

Under ISO/SAE CAN standards, CAN bus systems may employ dual wire busses for higher speeds, up to 1 Mbit/second, or single wire busses for lower speeds of up to 50 kbit/second. Various transceivers, such as the Philips AU5790 single wire transceiver, the Linear Technology LT1796 dual wire transceiver, and the Philips 82C250, are commercially available as well as protocol controllers.

Dual wire CAN bus systems and currently also single wire CAN bus systems have been employed in automotive systems. Typically, a plurality of diagnostic and control modules are provided in a vehicle and linked by a CAN bus. A technician can access the CAN network, and thus the modules, through a coupling to an external network. Various testing and diagnostic functions can then be performed through bidirectional data communications between the two networks.

Incompatibility problems are presented if the physical layer components of the vehicle CAN bus system and the external network are different. If the external network employs a dual wire CAN configuration while the vehicle bus system is a single wire CAN configuration, for example, an interface is needed to permit data communication between the two dissimilar busses. The interface must also control the direction of data transfer between the two busses in accordance with dominant bit signals issued on the busses. Transitions between data transfer directions should take place without incurring closed loop oscillations. Similar incompatibility issues require resolution when interfacing dual wire bus systems of different physical level properties.

SUMMARY OF THE DISCLOSURE

The subject matter described herein fulfills the above-described needs of the prior art. First and second CAN networks of different physical layers are interfaced by applying signals of the CAN busses of the two networks to respective transceivers. A dominant state of one of the busses is sensed and data is transferred between the two transceivers in a direction from the dominant bus.

The first and second CAN networks may comprise, respectively, a single wire bus and a dual wire bus. The two busses are interfaced by a logic circuit interposed between the transceivers. A first logic unit is operable as a unidirectional switch for passing signals between the CAN busses in a first direction. A second logic unit is operable as a unidirectional switch for passing signals between the CAN busses in a second direction. A control circuit is coupled to the first and second logic units for mutually exclusively activating and deactivating the first and second logic units to control the direction of data transfer between the CAN busses.

In one configuration, the direction of current in one of the busses is sensed and activation and deactivation signals are applied to the first and second logic units in response to the sensed direction. The current direction may be sensed by a comparator having a pair of inputs coupled to voltage nodes on one of the busses and an output coupled in reciprocal logical states, respectively, to the first and second logic units.

In a variation of this configuration, upon receipt of a dominant signal from a bus previously in a recessive state, transition of the data transfer direction is delayed. An output of the first logic unit is coupled to an input of the second logic unit and an output of the second logic unit is coupled to an input of the first logic unit. A delay logic unit has an output coupled to the second transceiver and a first input connected to the output of the first logic unit. A delay circuit is coupled between a second input of the delay logic unit and the output of the first logic unit. An inverter is coupled to the output of the first logic circuit and an inverter is coupled to the output of the second logic circuit.

Additional aspects and advantages will become readily apparent to those skilled in this art from the following detailed description, wherein only the preferred embodiments are shown and described, simply by way of illustration of the best mode contemplated of carrying out the invention. As will be realized, the disclosed concepts are applicable to other and different embodiments, and the disclosed details are capable of modifications in various obvious respects. Accordingly, the drawings and description are to be regarded as illustrative in nature, and not as restrictive.

BRIEF DESCRIPTION OF THE DRAWINGS

In the figures of the accompanying drawings, like reference numerals refer to similar elements.

DETAILED DESCRIPTION

Figure 1:
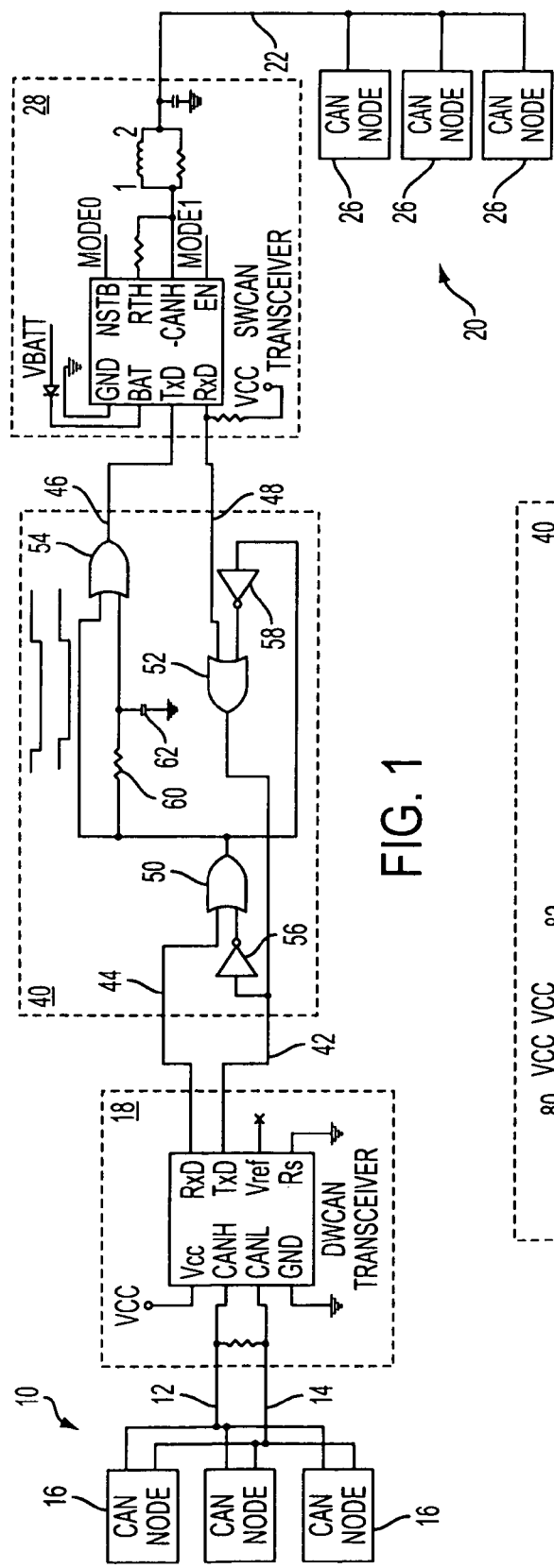
FIG. 1 is a schematic diagram of an interface arrangement between dissimilar CAN networks in accordance with the present invention.

FIG. 1 illustrates an arrangement for interfacing between a dual-wire CAN bus system 10 and a single-wire CAN bus system 20. CAN bus wires 12 and 14 link a plurality of CAN nodes 16 with dual-wire transceiver 18. The dual-wire transceiver 18, which may comprise a commercially available unit such as the Philips PCA82C250, is connected to logic interface 40 by send (TxD) line 42 and receive (RxD) line 44.

CAN bus wire 22 links a plurality of CAN nodes 26 to single-wire transceiver 28. The single-wire transceiver 28, which may comprise a commercially available unit such as the Philips AU5790D, is connected to logic interface 40 by send (TxD) line 46 and receive (RxD) line 48.

Logic circuit 40 comprises OR gates 50, 52 and 54, inverters 56 and 58, resistor 60 and capacitor 62. A first input of OR gate 50 is connected to line 44. A second input of OR gate 50 is connected to the output of inverter 56. A first input of OR gate 52 is connected to line 48. A second input of OR gate 52 is connected to the output of inverter 58. The output of OR gate 52 is connected to the input of inverter 56 and to line 42.

Resistor 60 and capacitor 62 are connected in series between the output of OR gate 50 and ground. The output of OR gate 50 is also connected to the input of inverter 58 and a first input of OR gate 54. The second input of OR gate 54 is connected to the junction between resistor 60 and capacitor 62. The output of OR gate 54 is connected to line 46.

OR gate 50 and inverter 56 function as a unidirectional directional switch that passes data from the output of transceiver 18 to the input of transceiver 28 and thus to wire 22 of the single-wire CAN network 20. This path will be in place if a dominant bit is sent by a CAN node 16 on the dual-wire bus before a dominant bit is sent by a CAN node 26 on the single wire bus. OR gate 52 and inverter 58 function as a unidirectional directional switch that passes data from the output of transceiver 28 to the input of transceiver 18 and thus to wires 12 and 14 of dual-wire CAN network 10. This path will be in place if a dominant bit is sent by a CAN node 26 on the single-wire bus before a dominant bit is sent by a CAN node 16 on the dual-wire bus.

OR gates 50 and 52 are in closed switch states when their output logic levels follow the logic input levels on the receive lines 44 and 48, respectively, at their first inputs. These states are in effect when the logic levels are low at the second inputs, respectively. When one of the transceivers is in a dominant state, the switch states of OR gates 50 and 52 are mutually exclusive, as the output of each gate is fed to the second input of the other gate through an inverter. When a dominant bus becomes recessive, another CAN node can become dominant and take over the transmit direction.

OR gate 54 prevents oscillation in the transition of transmission direction that could occur if the output of OR gate 50 were directly connected to the input line 46 of transceiver 28. For example, it is assumed that transceiver 28 is in a dominant state (logic level low) and is about to go recessive (logic level high). Prior to the transition, the low logic level output by transceiver 28 will have been reflected as a low logic level on the dual bus linked to transceiver 18. In the absence of the delay circuit and OR gate 54, in response to the occurrence of a high level at line 48 received from transceiver 28, a low level signal is applied to the second input of OR gate 50 via inverter 56. As there is a finite time delay, $t_{off}$, in the transceiver 18 for transition to the high logic level received at line 42, a low logic level will continue to be applied to the first input of OR gate 50 until the delay period $t_{off}$ has expired. If the low logic level output of OR gate 50 is directly fed to transceiver 28, bus 22 will be driven to the low logic level. Transceiver 28, which briefly transitioned to the recessive state by a high logic level bit at bus 22, will again attempt to assert a dominant state. The assertion of the dominant state will oscillate between the two transceivers. Data transmission will be precluded during the time in which neither transceiver can gain dominance. A similar oscillation effect would occur when the transceiver 18 relinquishes its dominant state.

The oscillation effects are eliminated by the delay circuit and OR gate 54. Upon receipt of a high logic level signal at line 48 from transceiver 28, a low level logic signal similarly will be output by OR gate 50 and immediately applied to the first input of OR gate 54. However, the second input of OR gate 54 will remain at the high logic level until capacitor 62 has sufficiently discharged. This time delay, determined by the values of resistor 60 and capacitor 62, is set to equal or exceed the $t_{off}$ delay period of transceiver 18. During this time, the logic level output of transceiver 28 remains high to open the state of OR gate 52. The low logic level signal output by OR gate thereafter will not change back the direction of data transmission as inverter 58 will maintain a high level input to OR gate 52.

In the embodiment of FIG. 1, the delay circuit and OR gate 54 are configured to couple the output of OR gate 50 to transceiver 28. Alternatively, these elements may be configured between the output of OR gate 52 and the input of transceiver 18 while the output of OR gate 50 is directly connected to transceiver 28. The time delay of resistor 60 and capacitor 62 would then be set to equal or exceed the $t_{off}$ delay period of transceiver 28. Oscillation would again be prevented. As the dual wire high speed transceiver 18, exemplified in FIG. 1, incurs a shorter $t_{off}$ delay period than that of the slower speed single wire transceiver 28, the illustrated configuration is preferable for this example.

Figure 2:
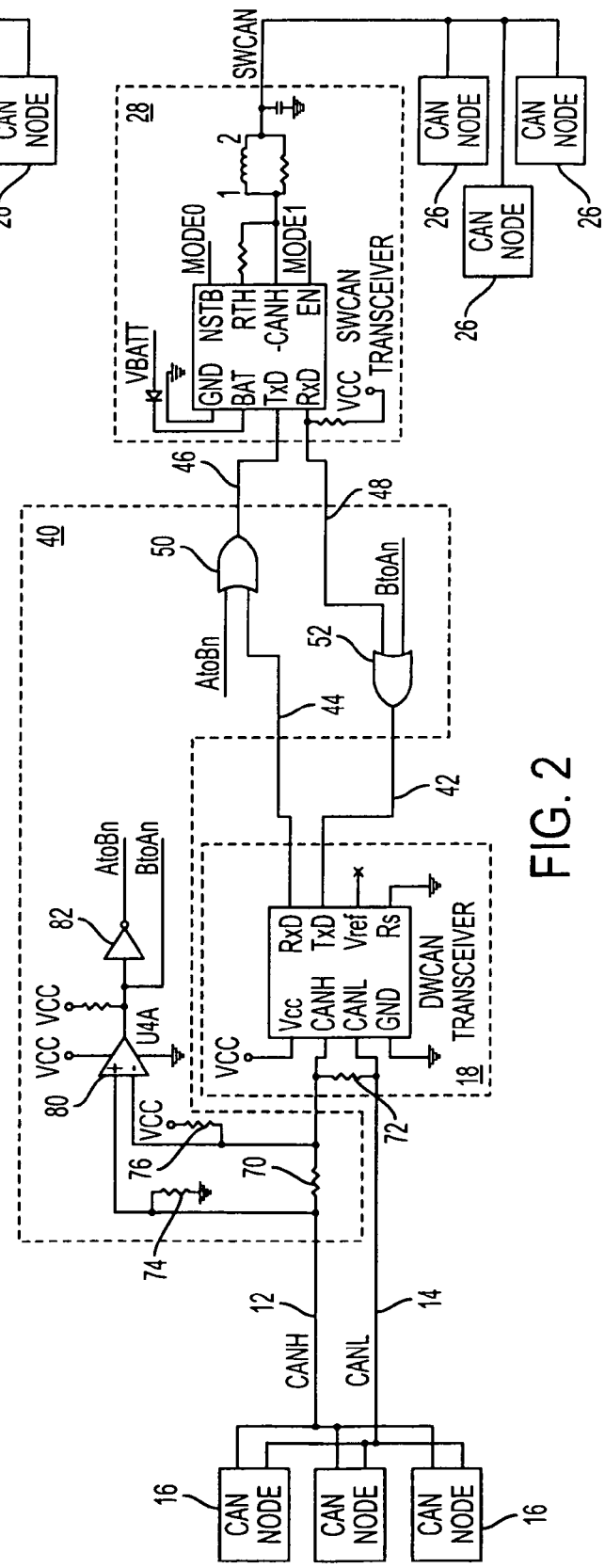
FIG. 2 is a schematic diagram that is a variation of the arrangement of FIG. 1.

FIG. 2 illustrates a variation of the interface shown in FIG. 1. A first input of OR gate 50 is connected to receive line 44 from transceiver 18. The output of OR gate 50 is connected to the send line 46 to transceiver 28. A first input of OR gate 52 is connected to receive line 48 from transceiver 28. The output of OR gate 52 is connected to the send line 42 to transceiver 28. A bias circuit, comprising resistors 70 and 72, are coupled to the transceiver 18. Resistor 70 is serially connected to bus line 12. Resistor 72 is connected across lines 12 and 14. A first node of resistor 70 is connected to ground through resistor 74. The second node of resistor 70 is connected to the voltage supply through resistor 76. Each node of resistor 70 is also connected to a respective input terminal of comparator 80. The second input of OR gate 52 is directly connected to the output of comparator 80. The second input of OR gate 50 is connected to the output of comparator 80 via inverter 82.

In operation, if all CAN nodes are recessive, lines 12 and 14 will float at a voltage level, for example, at 2.5v. A small bias voltage is created across resistor 70 via the source to ground serial circuit. The bias voltage creates a low logic level at the output of comparator 80. The low logic level signal is thus applied to the second input of OR gate 52, while the inverted signal of high logic level is applied to the second input of OR gate 50. The default data transfer direction is thus set to transmit from transceiver 28 to transceiver 18.

If a CAN node 26 transmits a low logic level (dominant) bit, the bit is copied to the dual wire bus through OR gate 52 and transceiver 18. At this time, both busses become dominant. The output of the comparator 80 does not change logic state because the polarity of the voltage across resistor 70 does not change. If, instead, a CAN node 16 transmits a low logic level bit, line 12 will be driven high and line 14 will be driven low. Current will flow through resistor 70 in the opposite direction. That is, current will flow from bus line 12, through resistors 70 and 72, to bus line 14. The output of comparator 80 will now be at a high logic level to change the OR gate to an open state and to change the OR gate 50, via invertor 82, to a closed state. Data transmission is thus set to the direction from transceiver 18 to transceiver 28. Dominant bits from a CAN node 16 will be copied by transceiver 28 to the bus 22.

If a CAN node 16 at the dual wire bus and a CAN 26 at the single wire bus 22 output a dominant bit at approximately the same time, both busses will achieve a dominant state. The direction of current flow through resistor may not be readily discernable as it depends upon which of node 16 or transceiver 18 imposes the highest voltage. Thus the logic level of the output of comparator 80 may be in either state. Such a situation does not cause a problem because both busses are in a dominant state and the data transfer direction is not relevant. The logic circuit would merely make a bus dominant that is already dominant.

Figure 3:
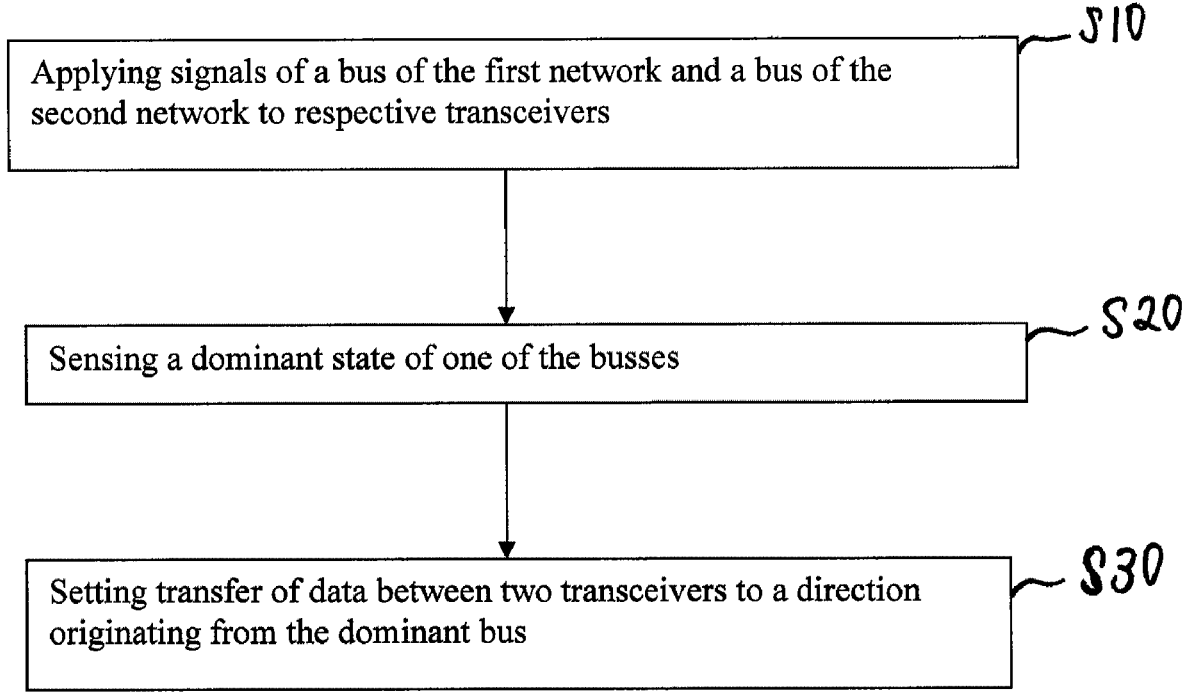
FIG. 3 is a flowchart of a method for interfacing two networks having different physical layers.

FIG. 3 is a flowchart of a method for interfacing two networks having different physical layers. Signals of the bus of the single-wire CAN network 20 and the bus of the dual-wire CAN network are applied to single-wire transceiver 28 and the dual-wire transceiver 18. (S10) Among the bus of the single-wire CAN network 20 and the bus of the dual-wire CAN network, a bus achieving a dominant state is sensed. (S20) When the bus having a dominant state is sensed, transfer of data is set between the single-wire transceiver 28 and the dual-wire transceiver 19 in a direction originating from the dominant state achieved bus.(S30)

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. Although CAN bus systems have been exemplified above, the invention is beneficial in other communication systems in which busses of different physical layers are to be interfaced. Aspects of the invention are also applicable for interfacing two dual wire bus systems having different physical characteristics and for interfacing two single wire bus systems having different physical characteristics.

What is claimed is:

1. Apparatus for a data communication network, comprising:
   an interface for coupling between a first bus and a second bus in a physical layer, wherein the first bus is a dual wire bus and the second bus is a single wire bus, the interface comprising:
   a first logic unit for unidirectionally passing signals between the busses in a first direction;
   a second logic unit for unidirectionally passing signals between the busses in a second direction;
   a first transceiver coupled between the first bus and the first logic unit for receiving and transmitting signals from and to both the first bus and the first logic unit;
   a second transceiver coupled between the second bus and the second logic unit for receiving and transmitting signals from and to both the second bus and the second logic unit; and
   a control circuit coupled to the first and second logic units for controlling the direction of signals passing between the busses,
   wherein, if a dominant bit is sent through the first bus, the control circuit transfers data from the first transceiver to the second transceiver, and, if a dominant bit is sent through the second bus, the control circuit transfers data from the second transceiver to the first transceiver,
   wherein either of the first and the second buses, through which the dominant bit is sent first, takes priority in transferring the data,
   wherein an output of the first logic unit is interconnected without one or more intervening functional components to an input of the second logic unit and the output of the first logic unit is coupled to the second transceiver, and
   wherein an output of the second logic unit is interconnected without one or more intervening functional components to an input of the first logic unit and the output of the second logic unit is coupled to the first transceiver.

2. The apparatus as recited in claim 1, wherein the data communication network is a controller area network (CAN) and the busses are CAN busses.

3. The apparatus as recited in claim 2, wherein one of the buses is configured to be linked with a CAN network in an automotive system.

4. The apparatus as recited in claim 1, wherein the control circuit comprises:
   a delay logic unit having an output coupled to the second transceiver and a first input connected to the output of the first logic unit, and a delay circuit coupled, in series, between a second input of the delay logic unit and the output of the first logic unit.

5. The apparatus as recited in claim 1, further comprising:
   a first inverter coupled to the output of the first logic unit; and
   a second inverter coupled to the output of the second logic unit.

6. The apparatus as recited in claim 5, wherein each of the first logic unit and the second logic unit includes an OR gate,
   an output of the first inverter coupled to the output of the first logic unit is coupled to an input of the OR gate of the second logic unit, and
   an output of the second inverter coupled to the output of the second logic unit is coupled to an input of the OR gate of the first logic unit.

7. The apparatus as recited in claim 1, wherein the control circuit comprises:
   a comparator having a pair of inputs coupled to voltage nodes on the first bus and an output coupled to the first and second logic units.

8. The apparatus as recited in claim 7, wherein
   a first input of the first logic unit is coupled to the first transceiver, an output of the first logic unit is coupled to the second transceiver, and a second input of the first logic unit is coupled to the output of the comparator; and
   a first input of the second logic unit is coupled to the second transceiver, an output of the second logic unit is coupled to the first transceiver, and a second input of the second logic unit is coupled to the output of the comparator through an inverter.

9. The apparatus as recited in claim 1, wherein at least one of the first logic unit and the second logic unit includes an OR gate.

* * * * *